US012429207B2

(12) United States Patent
Park

(10) Patent No.: US 12,429,207 B2
(45) Date of Patent: Sep. 30, 2025

(54) LED LIGHTING APPARATUS WITH HEAT DISSIPATING PLATE

(71) Applicant: Eun Hong Park, Anyang-Si (KR)

(72) Inventor: Eun Hong Park, Anyang-Si (KR)

( * ) Notice: Subject to any disclaimer, the term of this patent is extended or adjusted under 35 U.S.C. 154(b) by 0 days.

(21) Appl. No.: 18/762,535

(22) Filed: Jul. 2, 2024

(65) Prior Publication Data

US 2025/0052411 A1 Feb. 13, 2025

(30) Foreign Application Priority Data

Aug. 10, 2023 (KR) ........................ 10-2023-0105117

(51) Int. Cl.

| | |
|---|---|
| ***F21V 29/71*** | (2015.01) |
| ***F21V 19/00*** | (2006.01) |
| ***F21V 29/503*** | (2015.01) |
| ***F21V 29/61*** | (2015.01) |
| *F21Y 103/10* | (2016.01) |
| *F21Y 115/10* | (2016.01) |

(52) U.S. Cl.

CPC .......... *F21V 29/713* (2015.01); *F21V 19/002* (2013.01); *F21V 29/503* (2015.01); *F21V 29/61* (2015.01); *F21Y 2103/10* (2016.08); *F21Y 2115/10* (2016.08)

(58) Field of Classification Search

CPC .... F21V 29/713; F21V 19/002; F21V 29/503; F21V 29/61

See application file for complete search history.

(56) References Cited

U.S. PATENT DOCUMENTS

| | | | | |
|---|---|---|---|---|
| 8,071,998 B2 * | 12/2011 | Chen | ..................... | F21V 29/505 257/98 |
| 2013/0248584 A1 * | 9/2013 | Bi | ......................... | H10H 20/858 228/176 |
| 2019/0165232 A1 * | 5/2019 | Hung | ................... | H10H 20/851 |

FOREIGN PATENT DOCUMENTS

| | | | |
|---|---|---|---|
| JP | 2003204021 | A | 7/2003 |
| JP | 2008034342 | A | 2/2008 |
| JP | 2016076501 | A | 5/2016 |
| JP | 2018032609 | A | 3/2018 |
| JP | 6789582 | B2 | 11/2020 |
| KR | 20100120992 | A | 11/2010 |

(Continued)

OTHER PUBLICATIONS

Lee, The led lamp having heater pipe type radiator, 2015, KR101508958B1, https://patents.google.com/patent/KR101508958B1/en?oq=kr101508958 (Year: 2015).*

*Primary Examiner* — James R Greece
*Assistant Examiner* — Michael Chiang
(74) *Attorney, Agent, or Firm* — Renaissance IP Law Group LLP

(57) ABSTRACT

Provided is a Light Emitting Diode (LED) lighting apparatus, and more particularly, an LED lighting apparatus that effectively dissipates heat generated from a single LED. The LED lighting apparatus according to an exemplary embodiment includes a single LED which emits light, a printed circuit board which includes a base plate having a first surface and a second surface opposing each other, and in which the single LED is mounted on the first surface, and a heat dissipating plate which is provided on the second surface to dissipate the heat generated from the single LED. And the printed circuit board and the heat dissipating plate may be welded and bonded to each other.

12 Claims, 5 Drawing Sheets

(56) References Cited

FOREIGN PATENT DOCUMENTS

| | | | | | |
|---|---|---|---|---|---|
| KR | 20120121501 | A | | 11/2012 | |
| KR | 20130013390 | A | | 2/2013 | |
| KR | 20130074386 | A | | 7/2013 | |
| KR | 101507668 | B1 | | 3/2015 | |
| KR | 101508958 | B1 | * | 4/2015 | ................ F21S 8/08 |
| KR | 101681020 | B1 | | 12/2016 | |
| KR | 102538923 | B1 | | 6/2023 | |
| WO | 2008078788 | A1 | | 7/2008 | |
| WO | 2008132941 | A1 | | 11/2008 | |

* cited by examiner

LED LIGHTING APPARATUS WITH HEAT DISSIPATING PLATE

CROSS-REFERENCE TO RELATED APPLICATIONS

This application claims priority under 35 U.S.C. § 119 to Korean Patent Application No. 10-2023-0105117, filed on Aug. 10, 2023, the disclosure of which is incorporated herein by reference in its entirety.

TECHNICAL FIELD

The present inventive concept relates to a Light Emitting Diode (LED) lighting apparatus, and more particularly, to a LED lighting apparatus that effectively dissipates heat generated from a single LED.

BACKGROUND

Light Emitting Diodes (LED) may have excellent energy saving effects and be semi-permanently used compared to other light sources of illumination and display devices, for example, fluorescent lights and incandescent lights. Thus, recently, lighting using the LEDs is much favored. LED lighting apparatuses used in this lighting consume small power and have increased lifespan compared to existing lamps, and thus are emerging as new lights replacing the existing lamps.

In particular, pole lights illuminating vision inspection systems of factory automation and equipment of large plants, lighthouses delivering light to ships at a long distance, and the like, need to use very bright light and thus require several high-luminance (watt-class) LEDs.

In a high-luminance LED lighting apparatus on which a plurality of high-luminance LEDs are mounted on a small surface area, lifespan of lamps may be reduced due to thermal energy generated when the lamps are turned on. In general, the LEDs convert 20% of consumed power into light and 80% of the consumed power into heat. Thus, increasing the lifespan of the LEDs requires dissipating the heat generated inside the LED lighting apparatuses to the outside to maintain temperatures of the LEDs to be low.

In general, a thermal pad, a thermal grease, a thermal tape, or the like for transferring heat is inserted between a printed circuit board, on which single LEDs are mounted, and a heat dissipating plate, and in order to increase a thermal contact area, pressing is performed using coupling members such as bolts to increase heat dissipation efficiency. However, the thermal pad and the like are different in heat transfer coefficient for each manufacturer, and are different in heat transfer characteristic according to inserted states or assembled states. Thus, there is difficulty in effectively cooling the temperatures of the LED lighting apparatuses.

SUMMARY

Accordingly, the present inventive concept provides a Light Emitting Diode (LED) lighting apparatus capable of effectively dissipating heat generated from a single LED.

According to an aspect, there is provided a LED lighting apparatus including a single LED which emits light, a printed circuit board which includes a base plate having a first surface and a second surface opposing each other, and in which the single LED is mounted on the first surface, and a heat dissipating plate provided on the second surface to dissipate heat generated from the single LED. The printed circuit board and the heat dissipating plate may be welded and bonded to each other.

The single LED may include a heat transfer pad provided on a bottom surface of the single LED, which opposes the first surface of the printed circuit board.

The single LED may include a LED element, and a first electrode pad and a second electrode pad, each of which is provided on the bottom surface and supplies power to the LED element, and the heat transfer pad may be provided to be spaced apart from each of the first electrode pad and the second electrode pad, and be made of a metal.

The single LED may further include a ceramic substrate, on which the LED element is mounted, and a first via hole and a second via hole which pass through the ceramic substrate so as to electrically connect the LED element to the first electrode pad and the second electrode pad.

The printed circuit board may further include a first intermediate pad provided on the first surface and bonded to the heat transfer pad, a second intermediate pad provided on the second surface so as to correspond to the first intermediate pad, and a heat transfer via hole passing through the base plate so as to thermally connect the first intermediate pad and the second intermediate pad to each other.

The first intermediate pad may include a central portion bonded to the heat transfer pad, and an expansion connected to each of both ends of the central portion to extend to both sides.

The heat transfer pad and the first intermediate pad may be welded to each other through a first solder pattern layer provided between the heat transfer pad and the first intermediate pad.

The second intermediate pad and the heat transfer pad may be welded to each other through a second solder pattern layer provided between the second intermediate pad and the heat transfer pad and having a larger planar surface area than the first solder pattern layer.

The LED lighting apparatus may further include a temperature sensor part which is at least partially provided on the first intermediate pad and measures a temperature.

The LED lighting apparatus may further include an air flow generating part which is controlled according to the temperature measured by the temperature sensor part and generates air flow toward the heat dissipating plate.

At least one of the printed circuit board or the heat dissipating plate may include a positioning part which determines a bonding position for the printed circuit board and the heat dissipating plate.

According to another aspect, there is provided a LED lighting apparatus including a single LED which emits light, a printed circuit board which includes a base plate having a first surface and a second surface opposing each other, and in which the single LED is mounted on the first surface, a heat dissipating plate which is provided on the second surface to dissipate heat generated from the single LED, and has a top surface smaller than a bottom surface of the printed circuit board, and an intermediate plate which is provided between the printed circuit board and the heat dissipating plate, and has a bottom surface larger than the top surface of the heat dissipating plate. The intermediate plate and the printed circuit board, and the intermediate plate and the heat dissipating plate, may be welded and bonded to each other.

The intermediate plate may be made of a metal.

At least one of a top surface or a bottom surface of the intermediate plate may include an auxiliary positioning part which determines a bonding position for the intermediate plate and the printed circuit board or determines a bonding position for the intermediate plate and the heat dissipating plate.

BRIEF DESCRIPTION OF THE DRAWINGS

The accompanying drawings, which are included to provide a further understanding of the inventive concept and are incorporated in and constitute a part of this specification, illustrate embodiments of the inventive concept and together with the description serve to explain the principles of the inventive concept. In the drawings.

DETAILED DESCRIPTION OF EMBODIMENTS

Figure 1:
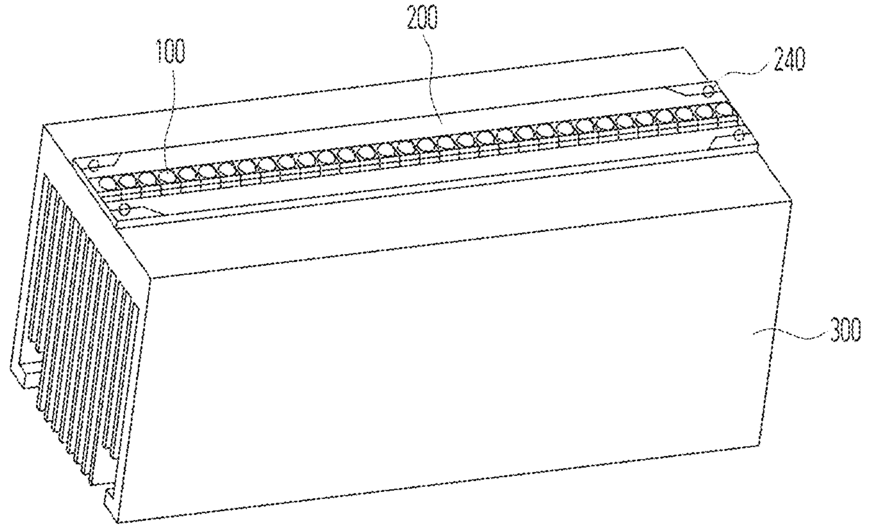
FIG. 1 is a perspective view of a Light Emitting Diode (LED) lighting apparatus according to an exemplary embodiment.

Hereinafter, specific embodiments will be described in detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present inventive concept to those skilled in the art. In the description, like elements are designated by like reference numerals. In the drawings, the dimension of elements may be partially exaggerated for effective description of the exemplary embodiments, and like reference numerals refer to like elements throughout.

Figure 2:
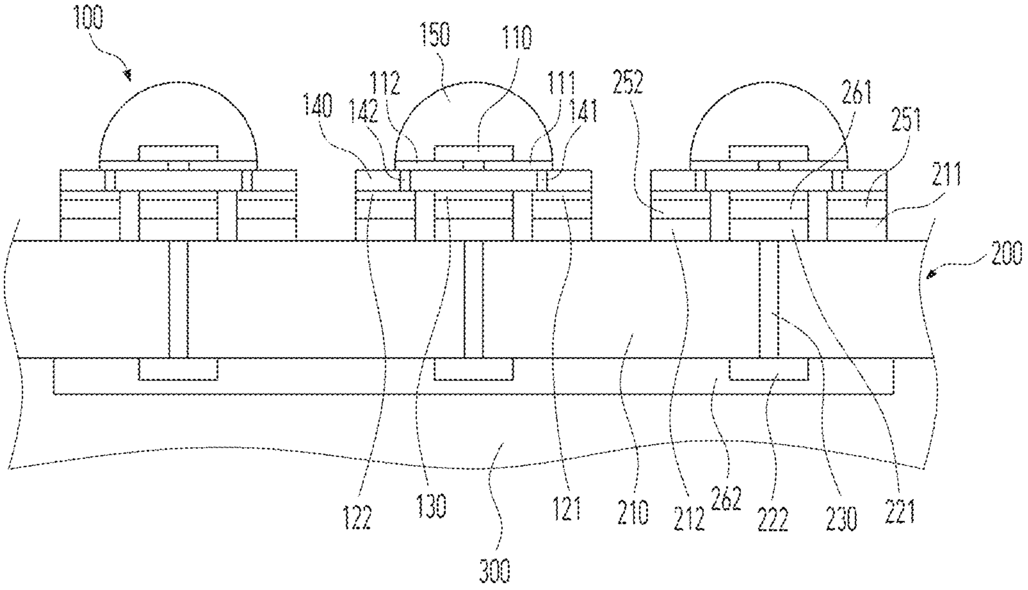
FIG. 2 is a cross-sectional view of a single LED and a printed circuit board according to an exemplary embodiment.
Figure 3:
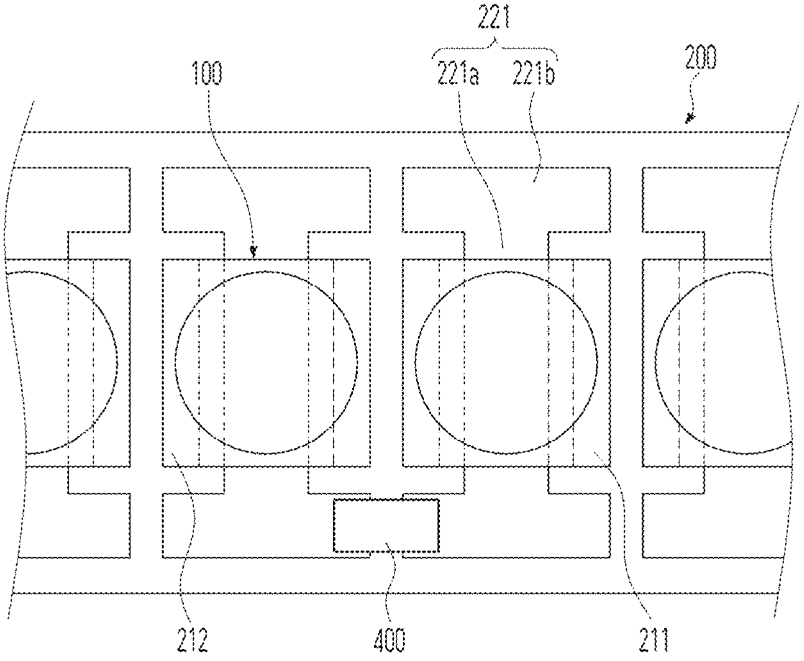
FIG. 3 is a view illustrating a bonded state of a single LED and a printed circuit board according to an exemplary embodiment.

FIG. 1 is a perspective view of a Light Emitting Diode (LED) lighting apparatus according to an exemplary embodiment. FIG. 2 is a cross-sectional view of a single LED and a printed circuit board according to an exemplary embodiment. FIG. 3 is a view illustrating a bonded state of a single LED and a printed circuit board according to an exemplary embodiment.

Referring to FIGS. 1 to 3, the LED lighting apparatus according to an exemplary embodiment may include a single LED 100 which emits light, a printed circuit board 200 which includes a base plate 210 having a first surface and a second surface opposing each other, and in which the single LED 100 is mounted on the first surface, and a heat dissipating plate 300 which is provided on the second surface and dissipates heat generated from the single LED 100. And the printed circuit board 200 and the heat dissipating plate 300 may be welded and bonded to each other.

The single LED 100 may include a LED element 110 that converts supplied electric energy into light energy and emits light. Here, the LED element 110 may be provided in one per single LED 100, or alternatively, a plurality of LED elements 110 may be provided in the form of an array. The LED element 110 may generate light when power is applied, and also generate heat in proportion to the applied current intensity.

The printed circuit board 200 is a component, which provides a position on which the single LED 100 is seated and mounted, and may include the base plate 210 having the first surface and the second surface opposing each other, and a circuit line for supplying power to the single LED 100. The base plate 210 may be made of FR-4 which is a laminate of woven fiberglass impregnated with a multifunctional epoxy resin so as to have a small weight and good bonding flatness, or may be made of a metal plate having excellent thermal conductivity. The circuit line is provided inside the base plate 210, or on a surface of the base plate 210, and receives power from an external power supply part to supply the power to the single LED 100.

The heat dissipating plate 300 may be provided on the second surface of the base plate 210, which opposes the first surface on which the single LED 100 is mounted, and dissipate the heat generated from the single LED 100. The heat dissipating plate 300 may be made of a metal material having an excellent thermal conductivity, and specifically, may be made of one metal material among copper, silver, aluminum, iron, nickel, and tungsten, or an alloy material including at least one of the foregoing metal materials. An outer surface of the heat dissipating plate 300 may be plated with one metal material among nickel, silver, and gold, or an alloy material including at least one of the foregoing metal materials. The heat dissipating plate 300 may include heat dissipating fins having various shapes to be brought into frequent contact with outside air so that the heat is dissipated.

LED lighting apparatuses according to the related art adopt methods of, for example, inserting a thermal pad, a thermal grease, a thermal tape, or the like between a printed circuit board, on which single LEDs are mounted, and a heat dissipating plate in order to improve heat transfer, and performing pressing using coupling members such as bolts in order to increase a thermal contact area. However, in the thermal pad and the like, there are limits to heat transfer characteristics, and the heat transfer characteristics are different according to states, in which the thermal pad or the like is inserted between the printed circuit board and the heat dissipating plate, or states of assembly with the coupling members or the like.

In this exemplary embodiment, the printed circuit board 200, on which the single LED 100 is mounted, and the heat dissipating plate 300 are welded and bonded to each other so that the heat generated from the single LED 100 is rapidly dissipated to the outside. The welding is a method for bonding the same kinds or different kinds of metal materials by applying heat and pressure so that the metal materials are directly coupled between solids, and the welded printed circuit board 200 and heat dissipating plate 300 are thermally mechanically bonded into complete one body. Thus, the heat generated from the single LED 100 may be rapidly dissipated to the outside through the heat dissipating plate 300, and even without a separate coupling member, the welded printed circuit board 200 and heat dissipating plate 300 may not cause issues about the thermal contact or the assembled states.

The single LED 100 may include a first electrode pad 121 and a second electrode pad 122, each of which is provided on a bottom surface of the single LED 100 mounted on the printed circuit board 200 and supplies power for light emission to the LED element 110. The first electrode pad 121 and the second electrode pad 122 may be electrically connected to a first line part 211 and a second line part 212, each of which is provided on the base plate 210 of the printed circuit board 200, and receive the power from the power source part.

The single LED 100 may further include a heat transfer pad 130 provided on the bottom surface opposing the first surface so as to be mounted on the printed circuit board 200. The heat transfer pad 130 may be provided to be spaced apart from each of the first electrode pad 121 and the second electrode pad 122 so as to be electrically isolated from the first electrode pad 121 and the second electrode pad 122, and be made of a thermally conductive metal to enable rapid heat transfer. The thermally conductive metal may be one metal material among copper, silver, aluminum, iron, nickel, and tungsten, or an alloy material including at least one of the foregoing metal materials. A first insultation protective layer may be further provided in a spaced space between the heat transfer pad 130 and each of the first electrode pad 121 and the second electrode pad 122.

For the heat generated from the single LED 100 to be rapidly dissipated through the heat dissipating plate 300, a sufficient thermal path from the single LED 100, from which the heat is mainly generated, to the printed circuit board 200 and the heat dissipating plate 300 is required. Thus, the heat transfer pad 130 may be provided on the bottom surface that is a surface on which the single LED 100 is mounted on the printed circuit board 200, thereby providing the thermal path through which the heat generated from the single LED 100 escapes to the outside of the single LED 100. When the heat escapes to the printed circuit board 200 and/or the heat dissipating plate 300 downward from the heat transfer pad 130, the heat inside the single LED 100 may be transferred to the heat transfer pad 130 to rapidly dissipate the heat.

The single LED 100 may further include a ceramic substrate 140 on which the LED element 110 is mounted, and a first via hole 141 and a second via hole 142 which pass through the ceramic substrate 140 so as to electrically connect the LED element 110 to the first electrode pad 121 and the second electrode pad 122.

A watt-class high-luminance LED element is necessary for the LED lighting apparatus requiring a high luminance, for example, vision inspection system lighting of factory automation or pole lights illuminating equipment of large plants, lighthouses delivering light to ships at a long distance, and the like. In the high-luminance LED element, very high-temperature heat is generated, and thus the LED element 110 may be supported by being mounted on the ceramic substrate 140 capable of maintaining stable mechanical strength even at a high temperature. The ceramic substrate 140 may be selected from ceramic materials such as alumina, aluminum nitride, and silicon carbide, each of which is a material having high strength and good thermal conductivity. As the ceramic substrate 140 is electric insulation, the first via hole 141 and the second via hole 142, each of which is defined by filling a through-hole passing through the ceramic substrate 140 with an electrically conductive material (e.g., Cu metal), may be used to electrically connect the LED element 110 to the first electrode pad 121 and the second electrode pad 122 through which the power is transmitted.

Meanwhile, in this exemplary embodiment, the thicker the ceramic substrate 140 is, the better the mechanical strength thereof may be. However, for minimization of a heat transfer path, and processibility for defining the through-holes to define the first via hole 141 and the second via hole 142, the ceramic substrate 140 may not need to be too thick and may have a thickness of tens to hundreds of micrometers (μm).

A direction, in which heat generated from the LED element 110 is transferred for the heat to be dissipated, is a thickness direction of the ceramic substrate 140, and thus a distance, over which the heat is transferred through the ceramic substrate 140 having the thickness of tens to hundreds of micrometers (μm), is small, thereby enabling the heat to be rapidly transferred. Thus, even without a separate structure passing through the ceramic substrate 140 and connected to the heat transfer pad 130, the heat inside the single LED 100 may be fast dissipated through the heat transfer pad 130 provided on the bottom surface of the single LED 100.

The single LED 100 may further include a molding member, which encloses the LED element 110 to protect the LED element 110, or a lens part 150 that controls a light path, for example, collecting paths of the light emitted from the LED element 110. An n electrode and a p electrode included in the LED element 110 may be connected to the first via hole 141 and the second via hole 142 through a first connection electrode 111 and a second connection electrode 112, respectively. In the high-luminance LED element 110, high current needs to flow to exhibit the high luminance, and thus the first connection electrode 111 and the second connection electrode 112 may be connected, respectively, to the n electrode and the p electrode in a Ball Gate Array (BGA) type.

The printed circuit board 200 may further include a first intermediate pad 221 provided on the first surface and bonded to the heat transfer pad 130, a second intermediate pad 222 provided on the second surface so as to correspond to the first intermediate pad 221, and a heat transfer via hole 230 passing through the base plate 210 so as to thermally connect the first intermediate pad 221 and the second intermediate pad 222 to each other.

Even though the heat transfer pad 130, which provides a path for rapidly transferring the heat inside the single LED 100, is provided, the dissipation of the LED lighting apparatus may be smoothly performed only when the heat transferred to the heat transfer pad 130 escapes to the outside. Thus, a heat transfer path through which the heat is rapidly transferable to the heat dissipating plate 300 through the printed circuit board 200 on which the single LED 100 is mounted, needs to be secured. When the first intermediate pad 221 provided on the first surface of the base plate 210 is bonded to the heat transfer pad 130, the heat transferred through the heat transfer pad 130 may be rapidly transferred to the first intermediate pad 221, and the heat may very fast escape to a lower portion of the printed circuit board 200 through the heat transfer via hole 230 connected to the first intermediate pad 221, and the second intermediate pad 222. Here, the first intermediate pad 221, the heat transfer via hole 230, and the second intermediate pad 222 may each be made of a metal such as cupper having excellent thermal conductivity.

In the printed circuit board 200, the first line part 211 and the second line part 212, each of which transmits an electrical signal, need to be electrically isolated from each other in order to transmit independent electrical signals without interference. Thus, each of the first line part 211 and the second line part 212 has a multilayer structure, and has a structure extending not only in the thickness (vertical) direction, which is a heat transfer direction, but also in a horizontal direction. Also in the first line part 211 and the second line part 212, each of the first line part 211 and the second line part 212 is made of a cupper metal that is an electrically conductive material, and thus has an excellent thermal conductivity, but may not be suitable for heat transfer toward the heat dissipating plate 300 because of a three-dimensional structure for transferring the electrical signal. On the other hand, the heat transfer via hole 230 may establish the shortest heat transfer path by filling a hole penetrated in the thickness (vertical) direction of the base plate 210 with a thermally conductive material and connecting the first intermediate pad 221 and the second intermediate pad 222 provided on the first surface and the second surface of the base plate 210. Accordingly, rapid heat transfer may be enabled.

The heat transferred from the heat transfer pad 130 may be rapidly transferred in the vertical direction through the first intermediate pad 221, the heat transfer via hole 230, and the second intermediate pad 222. However, if the heat is fast transferred even in the horizontal direction through the first intermediate pad 221 provided on the first surface of the base plate 210, the heat transferred from the heat transfer pad 130 may be more effectively dissipated. To this end, the first intermediate pad 221 may include a central portion 221*a* bonded to the heat transfer pad 130, and an expansion 221*b* that is connected to each of both ends of the central portion 221*a* and extends to both sides.

The central portion 221*a* of the first intermediate pad 221 may be in direct contact and bonded to the heat transfer pad 130, and heat transferred to the central portion 221*a* may be diffused in a first direction along the central portion 221*a* extending in the first direction, and be diffused to the expansions 221*b* extending from both the ends of the central portion 221*a* to both the sides in a second direction crossing the first direction, thereby enabling rapid heat transfer. The central portion 221*a*, which is bonded to the heat transfer pad 130 provided on the bottom surface of the single LED 100 having a small size, has a small width, but each of the expansions 221*b* provided outside the single LED 100 may extend to both the sides, thereby providing a large heat transfer surface area.

As the second intermediate pad 222 receives the heat from the first intermediate pad 221 and transfers the heat to the heat dissipating plate 300, the second intermediate pad 222 may include a central portion 222*a*, and an expansion 222*b* extending from each of both ends of the central portion 222*a* to both sides so that the second intermediate pad 222 has the same structure as the first intermediate pad 221. As the second surface of the base plate 210 has a larger available space than the first surface of the base plate 210 including structures such as the first line part 211 and the second line part 212 for mounting the single LED 100, the second surface may have a larger planar surface area including a shape of the first intermediate pad 221.

The heat transfer via hole 230 that connects the first intermediate pad 221 to the second intermediate pad 222 may be provided in plurality for more effective heat transfer. The heat transfer via hole 230 may be defined to have a uniform density over the central portion 221*a* and the expansion 221*b* of the first intermediate pad 221, or alternatively, may be defined to have different densities in the central portion 221*a* and the expansion 221*b* of the first intermediate pad 221. The central portion 221*a* to which the heat of the single LED 100 is directly transferred may have the heat transfer via hole 230 having a relatively high density or a relatively large average effective surface area per unit surface area so that more heat is rapidly diffusible to the lower portion. The expansion 221*b*, which receives the heat transferred in the horizontal direction to be likely to have a relatively low temperature, may have the heat transfer via hole 230 having a lower density or a smaller average effective surface area per unit surface area than the central portion 221*a*. The average effective surface area per unit surface area refers to a sum of a cross-sectional surface areas of the heat transfer via holes 230 in the horizontal direction. For example, in a case in which shapes of the heat transfer via holes 230 are the same, the density in the central portion 221*a* may be higher than the density in the expansion 221*b*.

The heat transfer pad 130 and the first intermediate pad 221 may be welded to each other through a first solder pattern layer 261 provided therebetween. As the heat transfer pad 130 and the first intermediate pad 221 are welded and bonded to each other, mechanical and thermal connection may be achieved, and the heat transferred to the heat transfer pad 130 may be rapidly transferred to the first intermediate pad 221.

The heat transfer pad 130 and the first intermediate pad 221 may be solder-welded and bonded to each other by forming a first solder paste pattern layer on the first intermediate pad 221 of the printed circuit board 200 by using a lead solder paste or a lead-free solder paste, and then forming the first solder pattern layer 261 through a reflow process. In order to mount the single LED 100 on the printed circuit board 200, the first electrode pad 121 and the second electrode pad 122 of the single LED 100 may be bonded to the first line part 211 and the second line part 212 of the printed circuit board 200 through a first electrode solder pattern layer 251 and a second electrode solder pattern layer 252, respectively, and at the same time, the heat transfer pad 130 and the first intermediate pad 221 may be bonded to each other through the first solder pattern layer 261. As not only the first intermediate pad 221 but also the first line part 211 and the second line part 212 are disposed on a mounting surface of the printed circuit board 200, the first solder pattern layer may be printed on the first intermediate pad 221 using a pattern mask without being formed on the first line part 211 and the second line part 212. Accordingly, the insulated state between the first line part 211 and the second line part 212 may be maintained.

The second intermediate pad 222 and the heat transfer pad 300 may be welded to each other through a second solder pattern layer 262 provided between the second intermediate pad 222 and the heat transfer pad 300 and having a larger planar surface area than the first solder pattern layer 261. The second intermediate pad 222 and the heat transfer pad 300 may be solder-welded and bonded to each other by forming a second solder paste pattern layer on the second intermediate pad 222 of the printed circuit board 200 by using a lead solder paste or a lead-free solder paste, and then forming the second solder pattern layer 262 through the reflow process. As the second surface of the base plate 210 has no structure for mounting the single LED 100 and thus has a relatively large available space. Thus, the second solder pattern layer 262 may have a larger planar surface area than the first solder pattern layer 261 in order to increase the thermal contact area so that the heat transferred from the second intermediate pad 222 is fast transferable to the heat dissipating plate 300. In order to stably maintain mechanical and thermal bonding between the printed circuit board 200 and the heat dissipating plate 300, the second solder pattern layer 262 may be provided on the entirety of the bottom surface of the printed circuit board 200, or alternatively, may be provided in a pattern in a size to coat a plurality of second intermediate pads 222 in common.

Meanwhile, the base plate 210 constituting a metal Printed Circuit Board (PCB), and/or the heat dissipating plate 300 are generally made of aluminum or aluminum alloy having good mechanical strength and thermal conductivity, but aluminum or aluminum alloy may not be bonded well through a lead or lead-free solder (soldering). In the metal Printed Circuit Board (PCB), the second surface of the base plate 210 may be made of aluminum or aluminum alloy, and in this case, the second intermediate pad 222 may be omitted, or alternatively, the second intermediate pad 222 may be further included for more effective heat dissipation. The second solder pattern layer 262 is provided also on the second surface of the base plate 210 regardless of the presence or absence of the second intermediate pad 222. Thus, in a case in which the base plate 210 is made of aluminum or aluminum alloy, for the printed circuit board 200 and the heat dissipating plate 300 to be stably bonded to each other, a nickel coating layer may be provided on the second surface of the bae plate 210 so that nickel forms a solid solution during the reflow process to form the solder (soldering) bond to be firm. For the firm solder bond, in the heat dissipating plate 300 made of aluminum or aluminum alloy, a nickel coating layer may be provided also on a bonding surface (or top surface) of the heat dissipating plate 300.

At least one of the printed circuit board 200 or the heat dissipating plate 300 may include a positioning part 240 that determines a bonding position for the printed circuit board 200 and the heat dissipating plate 300.

When the second solder pattern layer 262 is provided to have a larger planar surface area than the first solder pattern layer 261 for the stable bonding between the printed circuit board 200 and the heat dissipating plate 300, the second solder paste pattern layer may be at least partially melted during the reflow process, and the printed circuit board 200 and the heat dissipating plate 300 may slip over each other and be displaced from fixed positions. On the other hand, the first solder paste pattern layer provided between the heat transfer pad 130 and the first intermediate pad 221 has a relatively small planar surface area, and also the size of the single LED 100 is small. Thus, even when the first solder paste pattern layer is partially melted during the reflow process, the single LED 100 and the printed circuit board may not slip. When the printed circuit board 200 and the heat dissipating plate 300 are displaced from the fixed positions, a surface area to which the heat is transferred from the single LED 100 may be relatively decreased, and accordingly, the heat may not rapidly escape. The positioning part 240 may be formed in at least one of the printed circuit board 200 or the heat dissipating plate 300 so that the printed circuit board 200 and the heat dissipating plate 300 are bonded at an accurate bonding position without being displaced from the fixed positions even during the reflow process.

The positioning part 240 may be provided in the form of a recess and a protrusion corresponding to each other at the bonding position for the printed circuit board 200 and the heat dissipating plate 300. For example, a recess (or protrusion) may be defined near each of four corners of the printed circuit board 200, and a protrusion (or recess) may be provided on the bonding surface of the heat dissipating plate 300 at a position corresponding to the recess. Instead of the recess, a through-hole may be defined in the printed circuit board 200, and a portion of an upper side of the through-hole may be filled with a filler material. Alternatively, the positioning part 240 in the form of a stepped portion may be provided on the bonding surface of the heat dissipating plate 300 so as to correspond to an edge of the printed circuit board 200, or holes or recesses may be defined in corresponding positions of the printed circuit board 200 and the heat dissipating plate 300, respectively, and the positioning part 240 in the form of a fixing pin inserted into each of the holes or recesses may be provided.

And the positioning parts 240 provided near the four corners of the printed circuit board 200 may be configured differently between an upper side and a lower side on a plane (e.g., recesses are defined at the upper side, and protrusions are provided at the lower side), and also top and bottom and right and left directions in which the printed circuit board 200 is bonded to the heat dissipating plate 300 on a plane may be determined in a simple method.

The LED lighting apparatus according to an exemplary embodiment may further include a temperature sensor part 400 that is at least partially provided on the first intermediate pad 221 of the printed circuit board 200 and measures a temperature. The lifespan and the light emitting characteristic of the LED lighting apparatus may be changed according to a temperature of the LED element 110. Thus, the temperature of the LED element 110 needs to be monitored for performance management for the LED lighting apparatus. It is the most effective to measure the temperature at a position close to the LED element 110. However, as the LED element 110 is provided inside the single LED 100, and also the single LED 100 is mounted on the printed circuit board 200, it is not easy to mount the temperature sensor part to measure the temperature without interfering with traveling of the light emitted from the single LED 100. In this exemplary embodiment, a position, which is the closest to the single LED 100 on the thermal path through which the heat generated from the single LED 100 is dissipated to the outside, is the first intermediate pad 221. Thus, the temperature sensor part 400 may be provided on the first intermediate pad 221 so as to measure an accurate temperature of the single LED 100 or the LED element 110.

As the heat transfer pad 130 is connected to the central portion 221*a* of the first intermediate pad 221, the temperature sensor part 400 may be provided on the expansion 221*b* connected to each of both the ends of the central portion 221*a*, and the temperature sensor part 400 may be provided on the expansions 221*b* of the first intermediate pads 221 adjacent to each other to overlap the expansions 221*b*, thereby measuring an average temperature of the plurality of single LEDs 100.

The LED lighting apparatus according to an exemplary embodiment may further include air flow generating part (not shown) that is controlled according to the temperature measured by the temperature sensor part 400 and generates air flow toward the heat dissipating plate 300.

The temperature sensor part 400 may monitor the temperature of the single LED 100 or the LED element 110 for the performance management for the LED lighting apparatus, and adjust an amount of the air that is directed to the heat dissipating plate 300 by being generated by the air flow generating part according to the temperature measured by the temperature sensor part 400. In a case in which the temperature of the single LED 100 is not high, heat exchange with the air may occur to naturally dissipate the heat generated from the single LED 100 through the heat dissipating plate 300. However, when the temperature of the single LED 100 is higher than a predetermined temperature, there is a limit to the heat dissipation by natural convection. Thus, forced convection needs to be generated using the air flow generating part to allow the air flow to be directed to the heat dissipating plate 300 so that rapid heat exchange occurs. The air flow generating part is a device such as fan and blower, capable of forcing the air to flow, and may adjust the amount the air directed to the heat dissipating plate 300 by changing a rotation speed or the like of the fan according to the temperature measured by the temperature sensor part 400. A controller (not shown), which is connected to the temperature sensor part 400 and the air flow generating part and controls the air flow generating part by using the temperature measured by the temperature sensor part 400, may be mounted on the printed circuit board 200, or may be separately provided.

Figure 4:
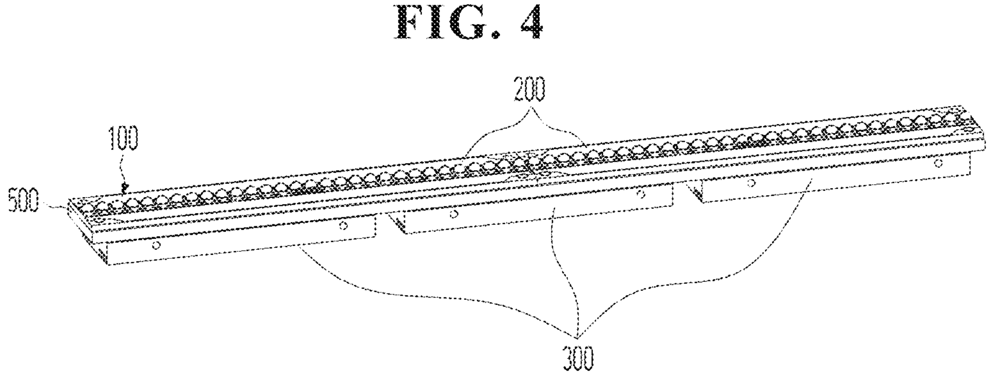
FIG. 4 is a perspective view of a LED lighting apparatus according to another exemplary embodiment.
Figure 5:
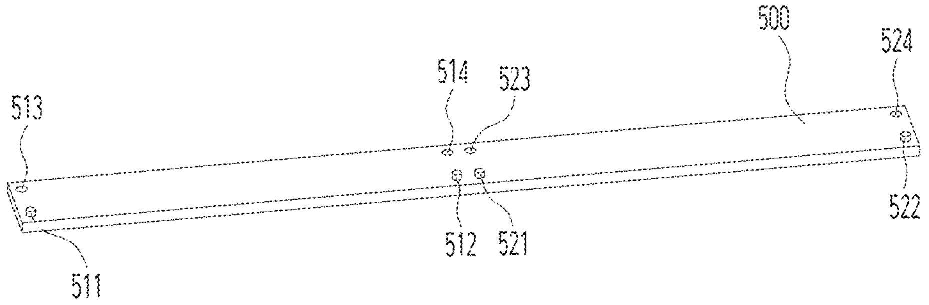
FIG. 5 is a perspective view of an intermediate plate according to another exemplary embodiment.

FIG. 4 is a perspective view of a LED lighting apparatus according to another exemplary embodiment. FIG. 5 is a perspective view of an intermediate plate according to another exemplary embodiment.

The LED lighting apparatus according to another exemplary embodiment may include a single LED 100 which emits light, a printed circuit board 200 which includes a base plate 210 having a first surface and a second surface opposing each other, and in which the single LED 100 is mounted on the first surface, a heat dissipating plate 300 which is provided on the second surface to dissipate heat generated from the single LED 100 and has a top surface smaller than a bottom surface of the printed circuit board 200, and an intermediate plate 500 which is provided between the printed circuit board 200 and the heat dissipating plate 300 and has a bottom surface larger than the top surface of the heat dissipating plate 300. And the intermediate plate 500 and the printed circuit board 200, and the intermediate plate 500 and the heat dissipating plate 300, may be welded and bonded to each other.

The LED lighting apparatus according to another exemplary embodiment will be described by avoiding the contents redundant with the contents described above with regard to the LED lighting apparatus according to an exemplary embodiment.

The printed circuit board 200 on which the single LED 100 is mounted may be provided in plurality according to an amount of light required for the LED lighting apparatus, and also the heat dissipating plate 300 may be provided in plurality according to an amount of heat that has to be dissipated. In a case in which a surface area of the bottom surface of the printed circuit board 200 is less than a surface area of the top surface of the heat dissipating plate 300 (e.g., see FIG. 1), the heat may be faster dissipated, and thus there is no thermal issue. However, in a case in which the surface area of the bottom surface of the printed circuit board 200 is greater than the surface area of the top surface of the heat dissipating plate 300, the heat of the single LED 100 disposed on an area, in which the printed circuit board 200 and the heat dissipating plate 300 are not in contact with each other, may not be sufficiently dissipated. Even in a case in which the plurality of heat dissipating plates 300 are bonded to the printed circuit board 200 having the larger bottom surface, a space is generated between the plurality of heat dissipating plates 300, and thus the heat of the single LED 100 disposed on this space may not be sufficiently dissipated. These situations may frequently occur in a case in which a commercial heat dissipating plate is used with no heat dissipating plate separately manufactured in accordance with a shape and a size of the printed circuit board.

In order to solve these situations, in this exemplary embodiment, the intermediate plate 500 having the bottom surface larger than the top surface of the heat dissipating plate 300 is inserted between the printed circuit board 200 and the heat dissipating plate 300 so as to suppress a reduction in heat dissipating characteristic of the single LED 100, which is likely to occur according to a difference in surface area of a bonding surface between the printed circuit board 200 and the heat dissipating plate 300. As the intermediate plate 500 covers an upper portion of the space between the plurality of heat dissipating plates 300, all of the single LEDs 100 mounted on the printed circuit board 200 may exhibit uniform heat dissipating characteristics.

To allow the heat transferred from the printed circuit board 200 on which the single LED 100 is mounted to be rapidly transferred to the heat dissipating plate 300, the intermediate plate 500 and the printed circuit board 200 may be welded to each other, and the intermediate plate 500 the heat dissipating plate 300 may be welded to each other so that the welded printed circuit board 200, intermediate plate 500, and heat dissipating plate 300 are thermally mechanically bonded into complete one body. Accordingly, the heat generated from the single LED 100 may be rapidly dissipated to the outside through the heat dissipating plate 300, and even without a separate thermal pad or coupling member, the welded printed circuit board 200, intermediate plate 500, and heat dissipating plate 300 may make it possible to suppress issues about the thermal contact or the assembled states.

Here, the intermediate plate 500 may be made of a thermally conductive metal so as not only to rapidly transfer the heat transferred from the printed circuit board 200 at an upper side to the heat dissipating plate 300 at a lower side, but also to allow the heat to be rapidly diffused also in the horizontal direction to enable constant heat transfer even between the heat dissipating plate 300 and the heat dissipating plate 300. The intermediate plate 500 may be made of a metal material having an excellent thermal conductivity, and specifically, may be made of one metal material among copper, silver, aluminum, iron, nickel, and tungsten, or an alloy material including at least one of the foregoing metal materials. For the firm solder bond, a nickel layer or a nickel alloy layer may be provided on an outer surface of the intermediate plate.

At least one of the top surface or the bottom surface of the intermediate plate 500 may include auxiliary positioning parts 511 to 514 and 521 to 524 which determines a bonding position for the intermediate plate 500 and the printed circuit board 200 or determines a bonding position for the intermediate plate 500 and the heat dissipating plate 300.

The printed circuit board 200 and the intermediate plate 500, and the intermediate plate 500 and the heat dissipating plate 300, may be solder-bonded by forming intermediate solder paste pattern layers between the printed circuit board 200 and the intermediate plate 500, and the intermediate plate 500 and the heat dissipating plate 300, and then forming intermediate solder pattern layers through a reflow process in which heat treatment is performed. Here, for the stable bond, each of the intermediate solder pattern layers formed on the top surface and the bottom surface of the intermediate plate 500 may have a larger planar surface area than the first solder pattern layer 261. For example, the intermediate solder pattern layer may be formed on the entirety of each of the top surface and the bottom surface of the intermediate plate 500.

The intermediate solder paste pattern layer may be at least partially melted during the reflow process, and the printed circuit board 200 and the intermediate plate 500, and/or the intermediate plate 500 and the heat dissipating plate 300, may slip over each other and be displaced from fixed positions. When the printed circuit board 200, the intermediate plate 500, and the heat dissipating plate 300 are displaced from the fixed positions, a surface area to which the heat is transferred from the single LED 100 may be relatively decreased, and accordingly, the heat may not rapidly escape. In order to solve this situation, the auxiliary positioning parts 511 to 514 and 521 to 524 may be provided in at least one of the top surface or the bottom surface of the intermediate plate 500 so that the printed circuit board 200, the intermediate plate 500, and the heat dissipating plate 300 are bonded at accurate bonding positions without being displaced from the fixed positions even during the reflow process.

The auxiliary positioning parts 511 to 514 and 521 to 524 may be provided in the form of recesses or protrusions corresponding to each other at the bonding position of the intermediate plate 500 for the printed circuit board 200 or the heat dissipating plate 300. For example, in a case in which the plurality of printed circuit board 200 are bonded to the top surface of the intermediate plate 500, a recess (or protrusion) may be defined near each of four corners of each of the printed circuit boards 200, and a protrusion (or recess) may be provided on the top surface of the intermediate plate 500 at a position corresponding to the recess. Likewise, the auxiliary positioning parts in the form of the recesses and the protrusions may be provided on the bottom surface of the intermediate plate 500 and the top surface of each of the plurality of heat dissipating plates 300, at positions corresponding to each other.

Instead of the recess, a through-hole may be defined in the printed circuit board 200 or the intermediate plate 500, and a portion of an upper side of the through-hole may be filled with a filler material. Alternatively, each of the auxiliary positioning parts 511 to 514 and 521 to 524 in the form of a stepped portion may be provided on the bonding surface of the intermediate plate 500 so as to correspond to an edge of each of the printed circuit board 200 and the heat dissipating plate 300, or holes or recesses may be defined in corresponding positions of the printed circuit board 200, the intermediate plate 500, and the heat dissipating plate 300, respectively, and the auxiliary positioning part in the form of a fixing pin inserted into each of the holes or recesses may be provided.

And the positioning parts 240 provided near the four corners of the printed circuit board 200 may be configured differently between an upper side and a lower side on a plane (e.g., recesses are defined at the upper side, and protrusions are provided at the lower side), and the auxiliary positioning parts may be configured on the top surface of the intermediate plate 500, to be different between an upper side and a lower side on a plane so as to correspond to the positioning parts 240 of the printed circuit board 200. Based on this configuration, top and bottom and right and left directions of the printed circuit board 200 bonded to the intermediate plate 500 on a plane may be simply determined to perform the boding.

According to an LED lighting apparatus according to an exemplary embodiment, a printed circuit board, on which a single LED is mounted, and a dissipating plate may be bonded to each other by welding. Thus, heat generated from the single LED, in which a significant portion of consumed power is converted into the heat, may be fast transferred to the heat dissipating plate, thereby maintaining a temperature of the single LED to be low and increasing lifespan of the LED lighting apparatus.

Moreover, as the printed circuit board on which the single LED is mounted is bonded to the heat dissipating plate by welding, the LED lighting apparatus according to an exemplary embodiment does not require an additional process, for example, inserting of a thermally conductive material such as a separate thermal pad between the printed circuit board and the heat dissipating plate, or assembling of the printed circuit board and the heat dissipating plate by pressing with a coupling member. Accordingly, not only easiness in assembling the LED lighting apparatus and assembly stability may be improved, but also stable heat transfer characteristics may be secured.

And a heat transfer pad may be provided on a bottom surface of the single LED mounted on the printed circuit board, and through an intermediate plate of the printed circuit board, which is bonded to the heat transfer pad, and a heat transfer via hole, the heat generated from the single LED may be very fast transferred to the heat dissipating plate.

A temperature sensor part may be at least partially provided on the intermediate pad that is a thermal path through which the heat generated from the single LED is transferred to the heat dissipating plate, thereby precisely measuring a temperature of the single LED or the LED lighting apparatus. Accordingly, the temperature of the LED lighting apparatus may be effectively controlled.

In a case in which planar surface areas of the printed circuit board and the heat dissipating plate are different from each other, the printed circuit board and the heat dissipating plate may be bonded to each other by inserting an intermediate plate made of a thermally conductive material between the printed circuit board and the heat dissipating plate. Thus, even in the heat dissipating plate having a smaller planar surface area than the printed circuit board, a plurality of heat dissipating plates can be bonded to the printed circuit board, and accordingly, heat generated from a LED element may be effectively dissipated to the outside.

According to the LED lighting apparatus according to the exemplary embodiment, the printed circuit board, on which the single LED is mounted, and the dissipating plate may be bonded to each other by welding. Thus, the heat generated from the single LED, in which the significant portion of the consumed power is converted into the heat, may be fast transferred to the dissipating plate, thereby maintaining the temperature of the single LED to be low and increasing the lifespan of the LED lighting apparatus.

Moreover, as the printed circuit board, on which the single LED is mounted, is bonded to the heat dissipating plate by welding, the LED lighting apparatus according to the exemplary embodiment does not require the additional process, for example, inserting of the thermally conductive material such as the separate thermal pad between the printed circuit board and the heat dissipating plate, or assembling of the printed circuit board and the heat dissipating plate by pressing with the coupling member. Accordingly, not only the easiness in assembling the LED lighting apparatus and the assembly stability may be improved, but also the stable heat transfer characteristics may be secured.

And the heat transfer pad may be provided on the bottom surface of the single LED mounted on the printed circuit board, and through the intermediate plate of the printed circuit board, which is bonded to the heat transfer pad, and the heat transfer via hole, the heat generated from the single LED may be very fast transferred to the heat dissipating plate.

The temperature sensor part may be at least partially provided on the intermediate pad that is the thermal path through which the heat generated from the single LED is transferred to the heat dissipating plate, thereby precisely measuring the temperature of the single LED or the LED lighting apparatus. Accordingly, the temperature of the LED lighting apparatus may be effectively controlled.

In the case in which the planar surface areas of the printed circuit board and the heat dissipating plate are different from each other, the printed circuit board and the heat dissipating plate may be bonded to each other by inserting the intermediate plate made of the thermally conductive material between the printed circuit board and the heat dissipating plate. Thus, even in the heat dissipating plate having the smaller planar surface area than the printed circuit board, the plurality of heat dissipating plates can be bonded to the printed circuit board, and the heat generated from the single LED may be effectively dissipated to the outside.

The meaning of "on . . . " used herein includes the case of direct contact and the case of not directly contacting, but disposed opposite to the upper or bottom surface, and not only disposed opposite to the entire upper or bottom surface, but also partially. It is also possible to be disposed oppositely, and it is used to mean that it faces away from itself or is in direct contact with the upper or bottom surface. In addition, the terms, such as "above", "below", "front end", "rear end", "upper portion", "lower portion", "upper end", or "lower end", are defined based on the drawings for convenience, and the shape and position of each component are not limited by these terms.

Although embodiments have been described with reference to a number of illustrative embodiments thereof, the embodiments are not limited to the foregoing embodiments, and thus, it should be understood that numerous other modifications and embodiments may be devised by those skilled in the art that will fall within the spirit and scope of the principles of this disclosure. Hence, the real protective scope of the present inventive concept shall be determined by the technical scope of the accompanying claims.

| [Description of the Symbols] | |
|---|---|
| 100: Single LED | 200: Printed circuit board |
| 300: Heat dissipating plate | 400: Temperature sensor part |
| 500: Intermediate plate | |

What is claimed is:

1. A Light Emitting Diode (LED) lighting apparatus comprising:

a single LED configured to emit light;

a printed circuit board which comprises a base plate having a first surface and a second surface opposing each other, and in which the single LED is mounted on the first surface; and a heat dissipating plate provided on the second surface to dissipate heat generated from the single LED, wherein the printed circuit board and the heat dissipating plate are welded and bonded to each other, wherein the single LED comprises a heat transfer pad provided on a bottom surface of the single LED, which opposes the first surface of the printed circuit board, wherein the printed circuit board further comprises:

a first intermediate pad provided on the first surface and connected to the heat transfer pad;

a second intermediate pad provided on the second surface so as to correspond to the first intermediate pad; and a heat transfer via hole passing through the base plate so as to thermally connect the first intermediate pad and the second intermediate pad to each other.

2. The LED lighting apparatus of claim 1, wherein the single LED comprises:

a LED element; and a first electrode pad and a second electrode pad, each of which is provided on the bottom surface of the single LED and supplies power to the LED element, wherein the heat transfer pad is provided to be spaced apart from each of the first electrode pad and the second electrode pad, and is made of a metal.

3. The LED lighting apparatus of claim 2, wherein the single LED further comprises:

a ceramic substrate on which the LED element is mounted; and a first via hole and a second via hole that pass through the ceramic substrate so as to electrically connect the LED element to the first electrode pad and the second electrode pad.

4. The LED lighting apparatus of claim 1, wherein the first intermediate pad comprises:

a central portion bonded to the heat transfer pad; and an expansion connected to each of both ends of the central portion to extend to both sides.

5. The LED lighting apparatus of claim 1, wherein the heat transfer pad and the first intermediate pad are welded to each other through a first solder pattern layer provided between the heat transfer pad and the first intermediate pad.

6. The LED lighting apparatus of claim 5, wherein the second intermediate pad and the heat transfer pad are welded to each other through a second solder pattern layer provided between the second intermediate pad and the heat transfer pad and having a larger planar surface area than the first solder pattern layer.

7. The LED lighting apparatus of claim 1, further comprising a temperature sensor part at least partially provided on the first intermediate pad and configured to measure a temperature.

8. The LED lighting apparatus of claim 7, further comprising an air flow generating part controlled according to the temperature measured by the temperature sensor part and configured to generate air flow toward the heat dissipating plate.

9. The LED lighting apparatus of claim 1, wherein at least one of the printed circuit board or the heat dissipating plate comprises a positioning part configured to determine a bonding position for the printed circuit board and the heat dissipating plate.

10. A Light Emitting Diode (LED) lighting apparatus comprising:

a single LED configured to emit light;

a printed circuit board which comprises a base plate having a first surface and a second surface opposing each other, and in which the single LED is mounted on the first surface;

a heat dissipating plate provided on the second surface to dissipate heat generated from the single LED, and having a top surface smaller than a bottom surface of the printed circuit board; and an intermediate plate provided between the printed circuit board and the heat dissipating plate, and having a bottom surface larger than the top surface of the heat dissipating plate, wherein the intermediate plate and the printed circuit board, and the intermediate plate and the heat dissipating plate, are welded and bonded to each other, wherein the single LED comprises a heat transfer pad provided on a bottom surface of the single LED, which opposes the first surface of the printed circuit board, wherein the printed circuit board further comprises:

a first intermediate pad provided on the first surface and connected to the heat transfer pad;

a second intermediate pad provided on the second surface so as to correspond to the first intermediate pad; and a heat transfer via hole passing through the base plate so as to thermally connect the first intermediate pad and the second intermediate pad to each other.

11. The LED lighting apparatus of claim 10, wherein the intermediate plate is made of a metal.

12. The LED lighting apparatus of claim 10, wherein at least one of a top surface or a bottom surface of the intermediate plate comprises an auxiliary positioning part configured to determine a bonding position for the intermediate plate and the printed circuit board or determine a bonding position for the intermediate plate and the heat dissipating plate.

* * * * *